United States Patent

Dunn

[15] 3,664,346
[45] May 23, 1972

[54] EYEBROW TWEEZERS

[72] Inventor: Dixie Dunn, Mobile, Ala.

[22] Filed: July 6, 1970

[21] Appl. No.: 52,181

[52] U.S. Cl................................................128/355, 81/5.1
[51] Int. Cl......................................A61b 17/28, B25b 7/00
[58] Field of Search........................81/5.1; 128/321, 354, 355

[56] References Cited

UNITED STATES PATENTS

| | | | |
|---|---|---|---|
| 1,471,422 | 10/1923 | Shearer | 128/321 X |
| 1,765,783 | 6/1930 | Young | 81/5.1 |
| 1,886,127 | 11/1932 | Silvis | 128/355 |
| 2,089,177 | 8/1937 | Beldue | 128/355 |

Primary Examiner—Channing L. Pace
Attorney—Cameron, Kerkam & Sutton

[57] ABSTRACT

Eyebrow tweezers are provided for people with poor vision which enable the plucking of eyebrows without the necessity of removing eyeglasses. The tweezers include a pair of jaw blades which are bent away from the plane of movement of the handle. The ends of the jaw blades have a portion thereof cut away and curved to provide flat knife-like mating edges and a firm gripping action. The edges form a point at one end to facilitate manipulation of the tweezers beneath or between eyebrow hairs.

1 Claim, 6 Drawing Figures

PATENTED MAY 23 1972 3,664,346

INVENTOR
DIXIE DUNN

BY *Cameron, Kerkam & Sutton*
ATTORNEYS

EYEBROW TWEEZERS

BACKGROUND OF THE INVENTION

This invention relates generally to tweezers adapted to be used for plucking eyebrows. More particularly, the invention is adapted for use by individuals having poor vision who are required to wear corrective lenses to compensate for their loss of vision.

Tweezers, in general, have been used for a variety of applications, such as, for example, the removal of hang nails, ingrown or superfluous hairs, foreign bodies, etc., and require a firm and tight gripping surface for gripping the object being worked upon. Over the years, a variety of tweezer configurations has been developed and most improvements have usually been directed to the gripping surface or jaw members. The gripping surface may take the form of a toothed construction as shown in U.S. Pat. No. 2,678,578 and design 157,104 or, in the alternative, the gripping surface may be a broad flat face as shown, for example, in U.S. Pat. No. 2,089,177. Such tweezers are designed for use where there are no obstructions. Accordingly, such tweezers are not readily adapted for use by individuals having poor vision who are required to wear glasses constantly.

Surprisingly, little attention has been paid to the needs of individuals with extremely poor vision who require the use of eyeglasses when taking care of their personal needs such as plucking eyebrows. As a result thereof, the plucking of eyebrows for such individuals must be done by a personal attendant, is left undone or, as a last resort, is done with the eyeglasses in place at the risk of knocking the eyeglasses off and accepting the aggravation of the obstruction.

SUMMARY OF THE INVENTION

The present invention enables the wearing of eyeglasses while plucking eyebrows. To this end, the tweezers are designed with long, scissor action handles having jaw members operatively connected at one end. The jaw members are bent away from the plane of operation of the handles. The ends of the jaw members have inward extensions which have a portion of the opposite interior surfaces cut away, while the opposite outer surfaces are curved inwardly to provide a flat knife edge gripping surface. The edges of the extensions mate to form a point which may be manipulated between the hairs to separate and select the hairs to be plucked.

While the specification concludes with claims particularly pointing out and distinctly claiming the subject matter of the invention, it is believed the invention will be more easily understood from the following description taken in connection with the accompanying drawing in which:

Figure 1:
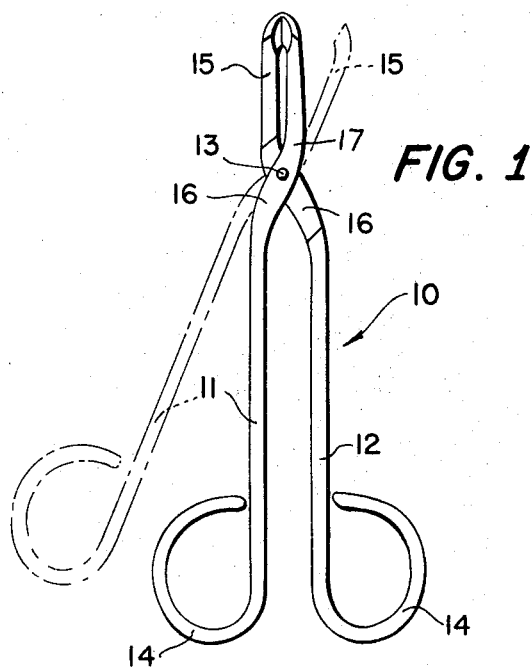
FIG. 1 is a rear elevational view of a pair of tweezers embodying the structural features of the invention.
Figure 2:
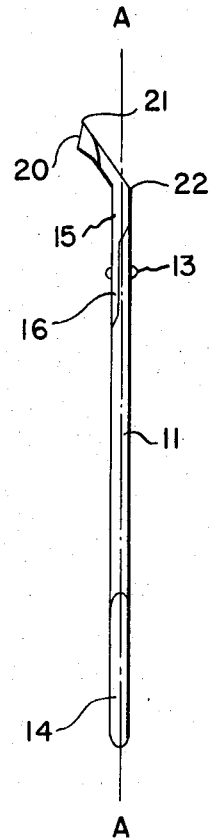
FIG. 2 is a left side elevational view of the tweezers shown in FIG. 1.
Figures 3, 4:
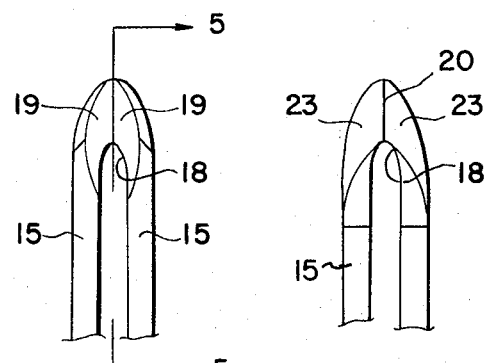
FIG. 3 is a fragmentary, enlarged rear elevational view of the jaw members of the tweezers shown in FIG. 1.
FIG. 4 is a fragmentary, enlarged front elevational view of the jaw members of the tweezers shown in FIG. 1.

Referring to the drawings, and in particular to FIG. 1, reference character 10 designates generally the improved eyebrow tweezers of the present invention comprising a pair of metal members 11 and 12 pivotally connected together. Each of the members move in a common plane, either individually or simultaneously, as indicated, for example, by the phantom lines in FIG. 1.

Each unit 11 and 12 comprises a handle member which is curved at the end as at 14 to form a finger receiving loop or grip by which the operator manipulates the tweezers. The other end of each unit 11 and 12 connects to a jaw member 15. Intermediate the jaw members and the finger loops, each unit has a wide flattened portion 16 through which a pivot pin or rivet 13 extends for pivotally connecting the two units together. To this end, the flattened portions abut and cross each other to provide a scissor-like action.

As best seen in FIGS. 2–6, each jaw is bent away from the plane of operation of the handles at an angle of about 35° and the flattened portions lie in a plane normal to that of the plane of operation of the handles. This enables the jaw members to be placed in contact with the hairs of the eyebrow while the operator's eyeglasses are being worn. The relatively long handles prevent the operator's fingers from obstructing the view of the eyebrow as reflected in a mirror, while allowing manipulation of the tweezers free and clear of the eyeglasses.

The jaws 15 are bowed outwardly at 17 contiguous to the pivot point and terminate with inward extensions 18 to provide optimum gripping action at the ends of the jaws. The opposite interior surfaces of the mating jaw extensions 18 each have a portion thereof cut away or milled as at 19 so that the jaws terminate in well defined straight lines that abut and provide a flat knife-like edge 20 having a maximum gripping action. The edge comes to a point at 21. This point facilitates manipulation of the tweezers beneath or between the hairs of the eyebrow.

Figure 5:
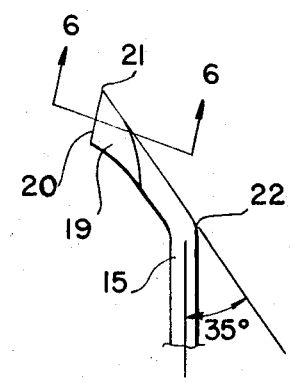
FIG. 5 is a fragmentary, left side view of the tweezers taken along line 5—5 of FIG. 3.
Figure 6:
FIG. 6 is a cross-sectional view of the tip of a jaw member taken along line 6—6 of FIG. 5.

The back surfaces 23 of the jaws are curved and fall away inwardly as shown in FIG. 5, so that the edges generally follow the slope or contour of the eyebrow. Tweezer action is on the back of the blade which may be pressed firmly against the skin so as to permit the hair to be gripped between the flat knife-like edges of the mating jaw members. To this end, it should be noted that the mating edges of the jaw members abut and are disposed at an angle with respect to the plane of operation of the handles, said latter plane being represented by lines A—A.

The overall dimensions of a typical tweezer embodying the present invention are: height 4½0 inches; distance between outer extremities of loops 14— 1⅞ inches; length of jaw member from tip 21 to bend point 22 — 34/64 inch; length of edge 20 — 13/64 inch. Preferably, the tweezers are fabricated from a hard metal such as, for example, stainless steel.

As should be apparent from the foregoing description, the tweezers embodying the present invention permit plucking of the eyebrows by one with poor vision without removal of the eyeglasses. The outer sloping and edge surfaces fit the curve of the eyebrow, while the point serves as a guide for separating hairs. The bend of the jaws away from the plane of operation of the handles enables the operator to place the tweezers over and around the rims of the operator's eyeglasses so as to enable the eyebrows to be plucked without removal of the operator's eyeglasses.

While the invention has been illustrated and described in connection with a preferred embodiment, minor changes may suggest themselves to those skilled in the art and it is the intention of the appended claims to cover all such changes which come within the true spirit and scope of the invention.

I claim:

1. An eyebrow tweezer adapted for use by a person wearing glasses designed to be operated over and above said glasses, comprises a pair of elongate handle members each having a finger engaging loop at one end, a gripping jaw at the other end and a flattened portion disposed adjacent said gripping jaw, said flattened portions bearing against each other in crossing relationship, a pivot pin extending through said flattened portions pivotally connecting said handle members, the handle members each being offset toward the other where they cross, continuing in close, parallel relationship and terminating in a convexly curved, cutaway extension provided with a rectilinear shoulder, said shoulders abutting each other to form mating, flattened operating surfaces, said shoulders lying in a plane at right angles to the plane of said handles and the jaw members being bent from the plane of said handles at an angle of approximately 35° whereby the operator may apply the extremities of the jaws to the eyebrows over the upper rims of the glasses while holding the tweezers by the finger loops thereof, below the lower edge of the glasses.

* * * * *